United States Patent
Bennett

(10) Patent No.: US 7,689,745 B2
(45) Date of Patent: Mar. 30, 2010

(54) MECHANISM FOR SYNCHRONIZING CONTROLLERS FOR ENHANCED PLATFORM POWER MANAGEMENT

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 1065 days.

(21) Appl. No.: 11/159,980

(22) Filed: Jun. 23, 2005

(65) Prior Publication Data

US 2006/0294274 A1 Dec. 28, 2006

(51) Int. Cl.
*G06F 13/00* (2006.01)

(52) U.S. Cl. ...................................... 710/100

(58) Field of Classification Search .................. 710/100
See application file for complete search history.

(56) References Cited

U.S. PATENT DOCUMENTS

| | | | | |
|---|---|---|---|---|
| 5,398,325 A | * | 3/1995 | Chang et al. ............... | 711/3 |
| 5,548,787 A | * | 8/1996 | Okamura ..................... | 710/25 |
| 5,721,828 A | * | 2/1998 | Frisch ......................... | 709/217 |
| 5,999,199 A | * | 12/1999 | Larson ........................ | 345/531 |
| 6,131,135 A | * | 10/2000 | Abramson et al. .......... | 710/113 |
| 6,564,304 B1 | * | 5/2003 | Van Hook et al. .......... | 711/154 |
| 6,772,266 B2 | | 8/2004 | Nalawadi | |
| 7,062,568 B1 | * | 6/2006 | Senevirathne et al. ....... | 709/234 |
| 2002/0091916 A1 | * | 7/2002 | Dowling ..................... | 712/228 |
| 2003/0225739 A1 | * | 12/2003 | Chesson et al. .............. | 707/1 |
| 2009/0048646 A1 | * | 2/2009 | Katoozi et al. ................ | 607/60 |

* cited by examiner

*Primary Examiner*—Thomas Lee
*Assistant Examiner*—Mohammed H Rehman
(74) *Attorney, Agent, or Firm*—Blakely, Sokoloff, Taylor & Zafman LLP

(57) ABSTRACT

In one embodiment, an apparatus to synchronize multiple controllers is disclosed. The apparatus comprises a plurality of controllers, and logic coupled to the plurality of controllers to control one or more controllers of the plurality of controllers to perform fetches simultaneously with one or more other controllers of the plurality of controllers. Other embodiments are also described.

15 Claims, 6 Drawing Sheets

610 → | 0 | 0 | 0 | 0 | 0 |

620 → | 1 | 0 | 0 | 0 | 0 |

630 → | 1 | 1 | 0 | 0 | 0 |

MECHANISM FOR SYNCHRONIZING CONTROLLERS FOR ENHANCED PLATFORM POWER MANAGEMENT

FIELD OF THE INVENTION

The embodiments of the invention relate generally to the field of platform power management and, more specifically, relate to a mechanism to synchronize multiple controllers.

BACKGROUND

Presently, chipset implementations may utilize multiple controllers to increase performance. For example, a chipset implementation may include one or more Universal Serial Bus (USB) host controllers. Multiple USB host controllers can increase performance by reducing the amount of USB bandwidth that is shared behind a single controller. Generally, a USB host controller can service two USB ports. With most mobile platforms containing multiple USB ports, these platforms must also contain multiple USB host controllers. Some platforms may have four or five USB host controllers.

Significantly, the operation of each USB host controller is independent from the other USB host controllers (i.e., the state of one has nothing to do with the state of another). Furthermore, the operation of the USB host controllers is periodic. Once started, a USB host controller will fetch a new work list, or frame, every 1 millisecond (ms).

When a processor enters a power saving mode the internal cache of the processor is no longer available. However, when USB devices need to access memory, the USB host controllers will snoop the cache of the processor to ensure that the data is not stored there. Accordingly, the processor must exit its power saving mode so that it can access the cache for this snoop. Inefficiency at the processor level may result, as the processor must be brought out of its low power state into a higher power state in order to service the snoop request of the USB host controller.

If multiple USB host controllers are implemented, there may be several fetches and snoops that prevent the processor from entering a low power state. For example, immediately prior to a USB host controller performing a fetch it will issue a "start of frame" marker. As all USB host controllers are started and operated independently by host software, the "start of frame" markers for each USB host controller may be offset within the 1 ms time interval for fetching. In such a scenario, the processor will not have a chance to enter an idle state, resulting in unnecessary power consumption.

Presently, no mechanism implemented today deals with this problem. Some solutions propose pre-fetching the next several work lists (frames). However, this solution is problematic as the USB host controller software is allowed to run very close to the hardware and thus a pre-fetch could result in stale data.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus to synchronize multiple controllers are presented. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Figure 1B:
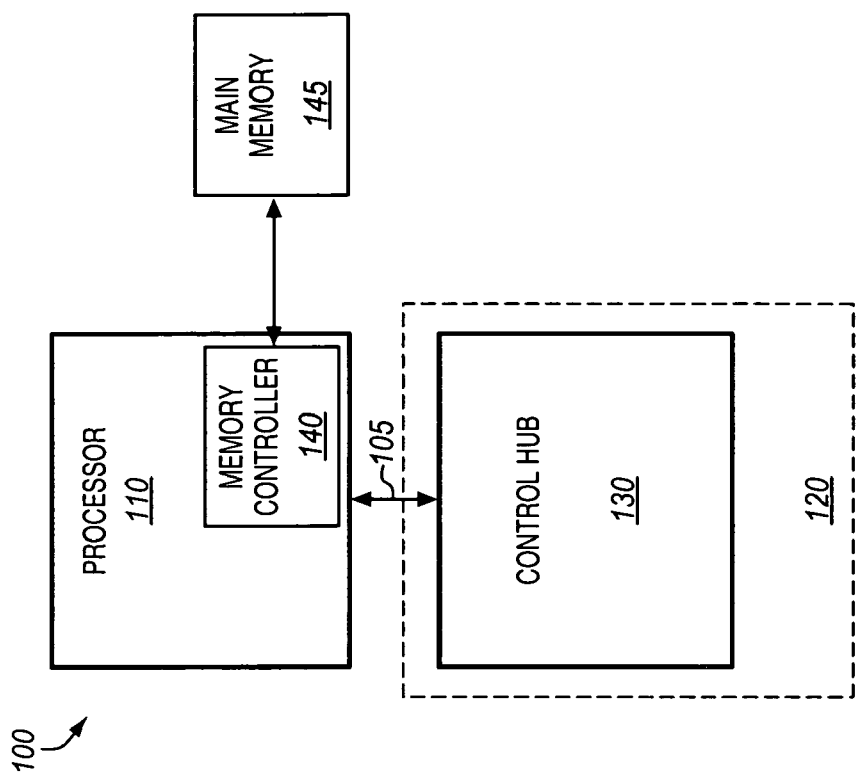
FIG. 1B illustrates a block diagram of another embodiment of a computer system.
Figure 1A:
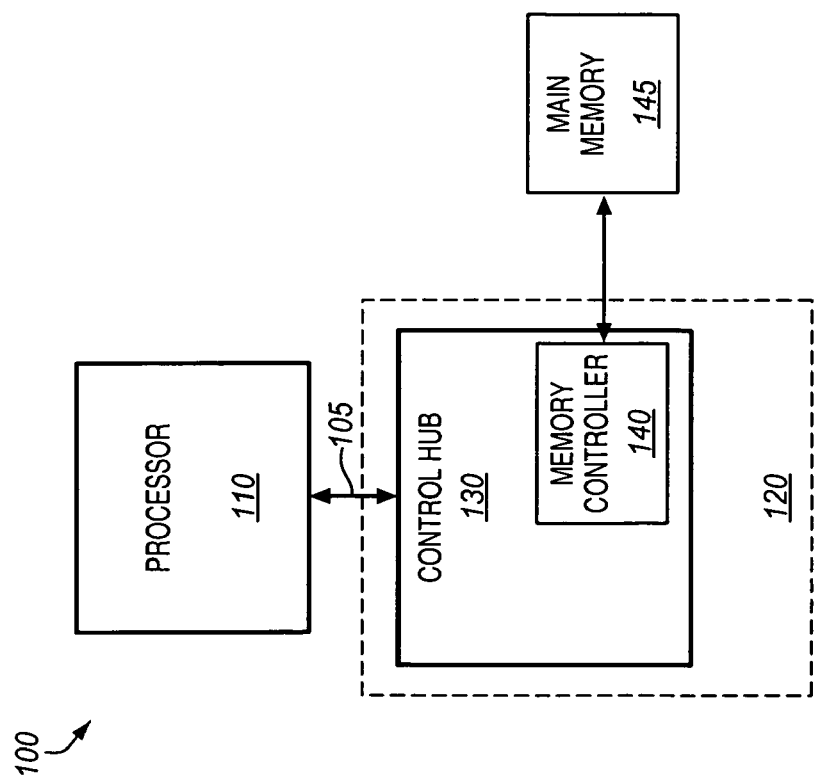
FIG. 1A illustrates a block diagram of one embodiment of a computer system.

FIGS. 1A and 1B illustrate a block diagram of one embodiment of a computer system 100. Computer system 100 includes a processor 110 coupled to an interconnect 105. In some embodiments, the terms processor and central processing unit (CPU) may be used interchangeably. In one embodiment, processor 110 is a processor in the Pentium® family of processors including the Pentium® IV processors available from Intel Corporation of Santa Clara, Calif. Alternatively, other processors may be used. In a further embodiment, processor 110 may include multiple processor cores.

According to one embodiment, interconnect 105 communicates with a control hub 130 component of a chipset 120. In some embodiments, interconnect 105 may be point-to-point or, in other embodiments may be connected to more than two chips. Control hub 130 includes a memory controller 140 that is coupled to a main system memory 145, as depicted in FIG. 1A. In other embodiments, memory controller 140 may be in the same chip as processor 110, as depicted in FIG. 1B.

In some embodiments, the memory controller 140 may work for all cores or processors in the chip. In other embodiments, the memory controller 140 may include different portions that may work separately for different cores or processors in the chip.

Main system memory 145 stores data and sequences of instructions and code represented by data signals that may be executed by processor 110 or any other device included in computer system 100. In one embodiment, main system memory 145 includes dynamic random access memory (DRAM); however, main system memory 145 may be implemented using other memory types. According to one embodiment, control hub 130 also provides an interface to input/output (I/O) devices within computer system 100.

Embodiments of the invention synchronize multiple controllers for enhanced platform power management. Some embodiments may utilize hardware, while other embodiments may utilize a combination of hardware and firmware, to synchronize the multiple controllers. The following description will describe embodiments of the invention with reference to Universal Serial Bus (USB) host controllers. However, one skilled in the art will appreciate that other controller implementations may utilize the various embodiments of this invention.

Figure 2:
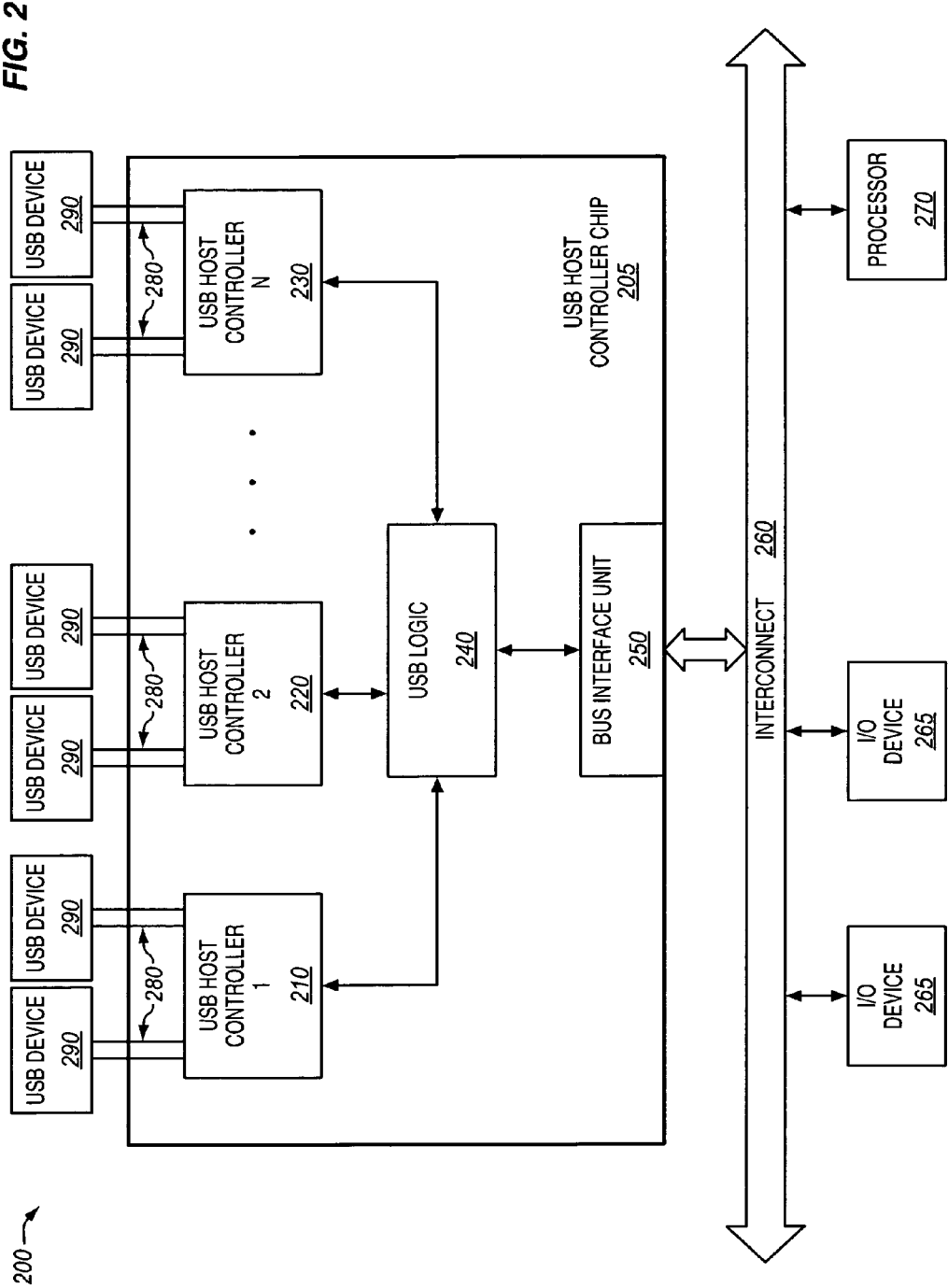
FIG. 2 illustrates a block diagram of one embodiment of a system for synchronizing multiple Universal Serial Bus (USB) host controllers.

FIG. 2 is a block diagram illustrating a more detailed view of a system 200 to implement multiple USB host controllers with synchronized start of frame times, and therefore synchronized fetches. System 200 includes USB host controller chip 205, interconnect 260, I/O devices 1-N 265, processor 270, and USB devices 290.

In one embodiment, USB host controller chip 205 may be embodied within control hub 130 of FIGS. 1A and 1B. USB host controller chip 205 further includes USB host controllers 1-N 210-230, USB logic 240, and bus interface unit 250. USB devices 290 are connected to the USB host controllers 1-N 210-230 through USB ports 280. USB host controllers 210-230 operate to perform initiator protocols that are necessary for USB devices 290 to access bus interface unit 250 and interconnect 260. Embodiments of the invention may apply to any number of USB host controllers, as illustrated in FIG. 2 with 'N' USB host controllers.

Figure 3:
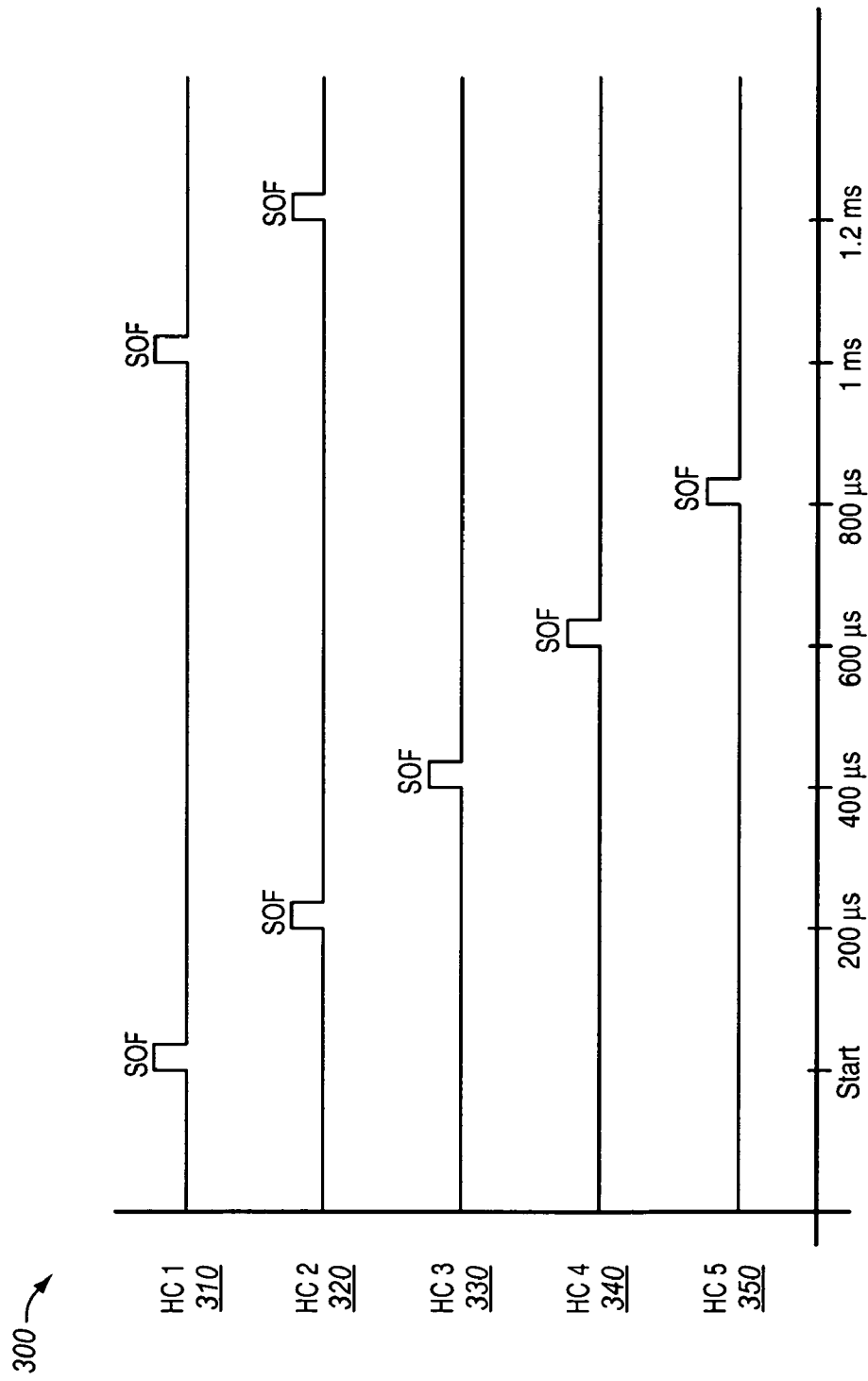
FIG. 3 illustrates a timing diagram of the conventional operation of multiple USB host controllers.

FIG. 3 illustrates a timing diagram 300 depicting a conventional operation of multiple USB host controllers in a computer system without synchronization of the USB host controllers. The initiation and start of frame times for five USB host controllers 310-350 are diagrammed.

Without synchronization of the USB host controllers 310-350, they act independently of each other. Each USB host controller 310-350 is individually initiated by host software. Once initiated, each USB host controller 310-350 performs a new work list fetch, or start of frame, every 1 millisecond (ms). In a worst-case scenario, the USB host controllers 310-350 may perform their fetches in evenly dispersed intervals over the 1 ms time interval. This results in a fetch being performed by a USB host controller 310-350 every 200 micro-seconds (μs). Such a scenario is illustrated in timing diagram 300.

As illustrated, USB host controller 1 310 is started first and performs its fetch, represented by the start of frame (SOF) indication, and then goes idle for 1 ms. Then, USB host controller 2 320 is started 200 μs later and immediately performs its fetch and goes idle for 1 ms. USB Host controller 3 330 starts and performs its fetch 400 μs after USB host controller 1 310 and 200 μs after USB host controller 2 320. USB host controller 4 340 initiates and performs its fetch 600 μs after USB host controller 1 310, and USB host controller 5 350 initiates and performs its fetch 800 μs after USB host controller 1 310.

This even dispersal of fetches over the 1 ms time interval prevents the processor from entering into a low power state, thus contributing to increased power consumption. Embodiments of the invention overcome the lack of synchronized fetches by multiple USB host controllers. USB host controller chip 205 includes USB logic 240 coupled to USB host controllers 210-230 that synchronizes the fetching mechanism of the USB host controllers 210-230.

Figure 4:
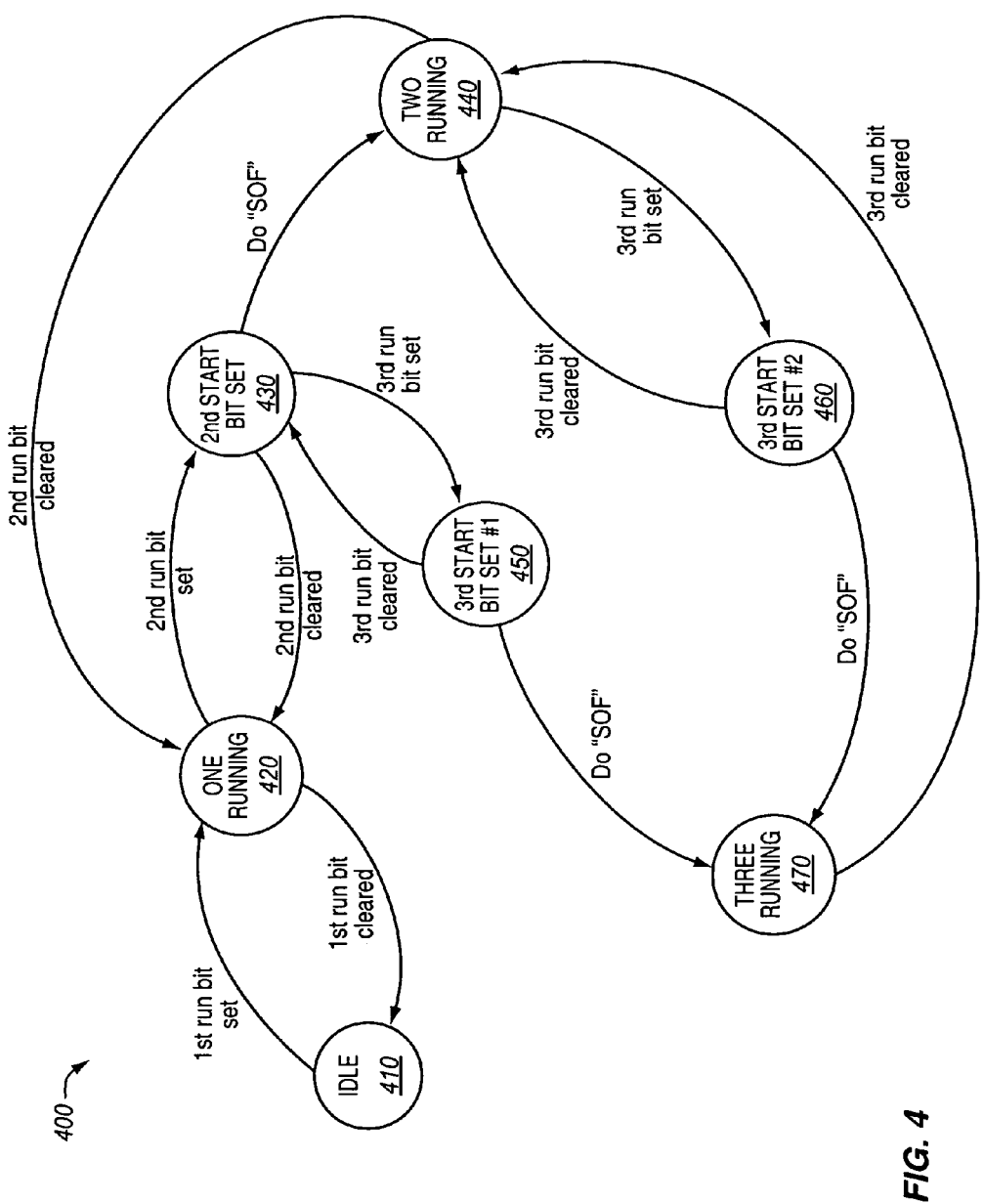
FIG. 4 illustrates a state diagram of one embodiment of a state machine to synchronize multiple USB host controllers.

FIG. 4 is a state diagram illustrating a state machine to synchronize the USB host controllers 210-230. In one embodiment, state machine 400 may be implemented as USB logic 240 in FIG. 2. State machine 400 is illustrated as operating on three independent USB host controllers. One skilled in the art will appreciate that a mechanism similar to this can be expanded to operate on 'N' USB host controllers.

Initially all three USB host controllers are at an idle state 410. The first controller is allowed to start as soon as its "run" bit is set, as seen in the one running state 420. The "run" bit may be a data value stored in a register that indicates that the USB host controller has been started and subsequently will begin its fetching mechanism. The second and third controllers are gated until a start of frame marker ("Do SOF") from the first controller is observed. This gating is observed at the "$2^{nd}$ start bit set" 430 state and the two "$3^{rd}$ start bit set" states 450, 460. The fetch mechanism for the USB host controllers can be gated because there is no requirement that once a host controller turns on it should immediately perform a fetch.

When the "run" bit for the $2^{nd}$ and $3^{rd}$ controllers are set, fetches are prevented until a start of frame marker ("Do SOF") is observed. When this start of frame marker is observed, the state machine 400 moves into the two running or three running states 440, 470, allowing the run bit to propagate. As depicted, the $3^{rd}$ start bit may be tracked twice. In the first case 450, the $3^{rd}$ start bit was set after the $2^{nd}$ start bit, but before a new start of frame marker was observed. In the second case 260, the $3^{rd}$ start bit was set after the start of frame marker was set for the $2^{nd}$ controller.

In one embodiment, logic 240 may utilize a timer connected with each USB host controller that indicates when the 1 ms time period has expired, thereby indicating a start of frame marker. Logic 240 may recognize a "timer expired" or "timer rolled over" indication from the particular USB host controller, and utilize this indication to inform other USB host controllers that they may begin fetching. In this way, new software does not have to be utilized, as logic 240 can observe the "run" bit and timer indications from each USB host controller to synchronize multiple USB host controllers.

Figure 5:
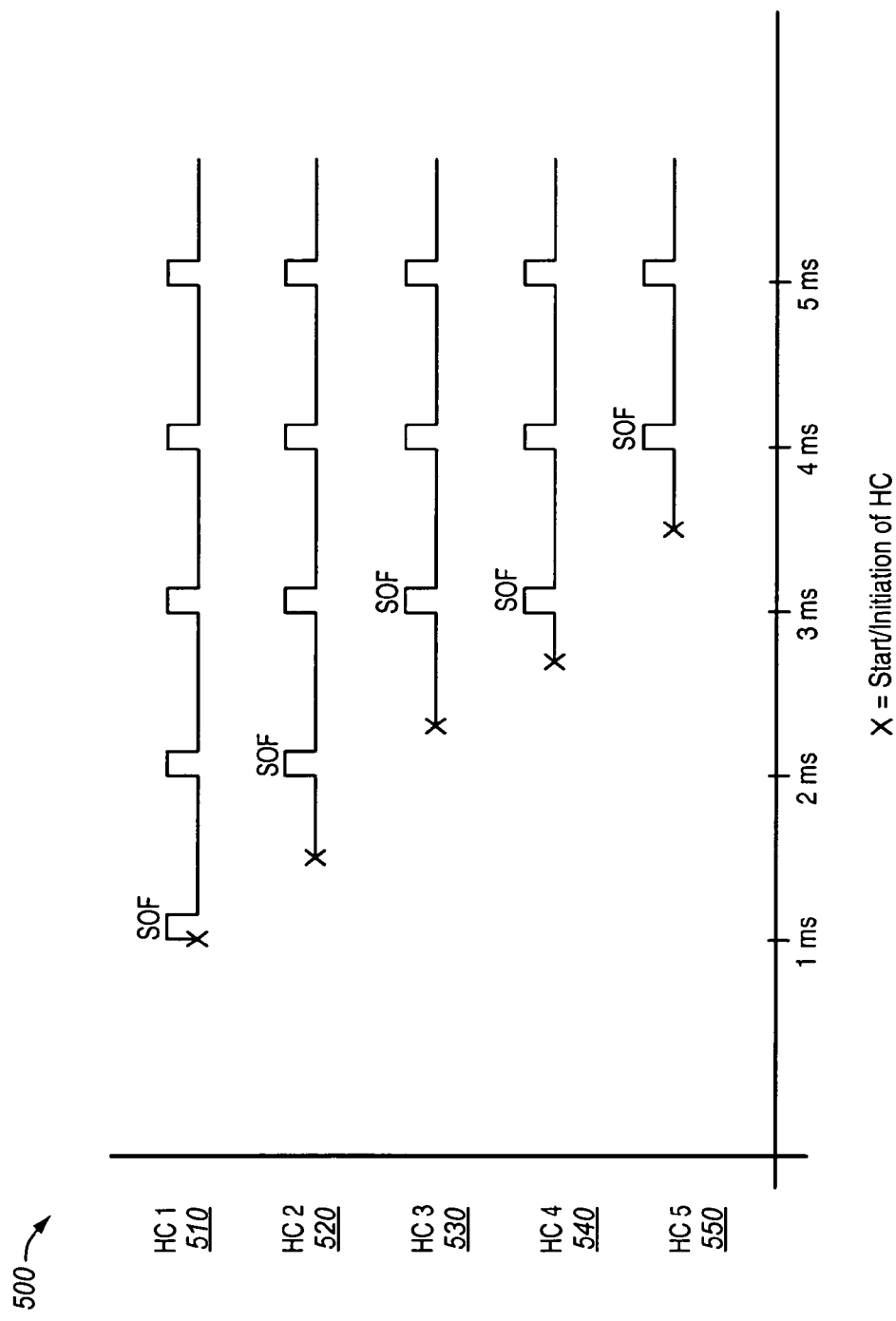
FIG. 5 illustrates a timing diagram of one embodiment of the synchronized operation of multiple USB host controllers.

FIG. 5 is a timing diagram 500 illustrating the operation of multiple USB host controllers with their start of frame times synchronized according to various embodiments of the present invention. As illustrated, host controller 1 510 is initiated (i.e., start bit is set) and fetches at the 1 ms mark. Host controller 2's 520 "run" bit is set between the 1 ms and 2 ms mark. However, USB logic 240 gates the host controller 2 520 until a start of frame marker is observed, which is immediately before host controller 1 510 performs its second fetch. Then, at the 2 ms mark both host controller 1 510 and host controller 2 520 perform synchronized fetches.

Between the 2 ms and 3 ms mark, both host controllers 3 530 and 4's 540 "run" bits are set. However, USB logic 240 gates the two host controllers 530, 540 until the next start of frame marked is observed immediately prior to the expiration of the 1 ms time period for host controllers 510 and 520. Thereafter, at the 3 ms mark, host controllers 510-540 all perform their fetches simultaneously. Between the 3 ms and 4 ms mark, host controller 5's 550 "run" bit is set. USB logic 240 gates host controller 5 550 until the next start of frame marker, and then all five host controllers 510-550 perform synchronized fetches at the 4 ms mark and 5 ms mark.

Figures 6, 7:
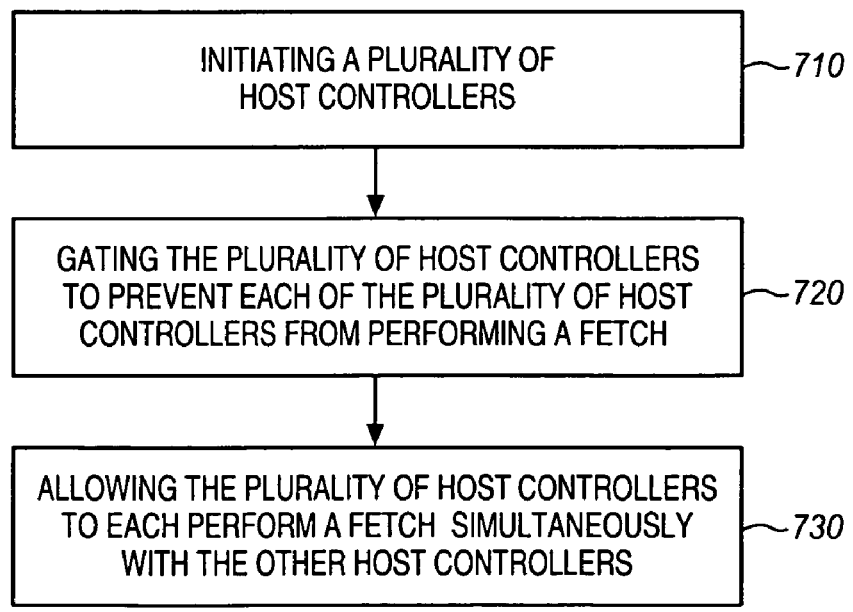
FIG. 6 illustrates a block diagram of another embodiment of a system to synchronize multiple USB host controllers.
FIG. 7 is a flow diagram depicting one embodiment of a method to synchronize fetches of multiple USB host controllers.

In another embodiment, USB logic 240 may be implemented as a score-boarding mechanism that tracks multiple USB host controller states. FIG. 6 illustrates one embodiment of a score-boarding mechanism that may be implemented. In one embodiment, a set of register mechanisms may be utilized to track the states of multiple USB host controllers. A bit is set aside for each USB host controller to indicate the state of the host controller. As illustrated in FIG. 6, five bits are illustrated indicating that five USB host controllers are being tracked. However, embodiments of the invention are not limited to such an implementation.

Initially, all bits are set to '0' 610 to indicate an inactive state of all the USB host controllers. Whenever a run bit is set, the register representing that particular host controller is changed to '1'. When only one bit of the score-boarding mechanism is set to '1' 620, all operations proceed normally with the one host controller initiating and immediately fetching. However, when 2 or more bits are set to '1' 630, a pausing mechanism is invoked to prevent the USB host controllers from performing a fetch until a start of frame marker is observed.

FIG. 7 is a flow diagram illustrating one embodiment of a method to synchronize multiple USB host controllers. The process begins at processing block 710, where USB host controller software initiates a plurality of USB host controllers. In one embodiment, each of the plurality of USB host controllers is independently initiated at different times.

At processing block 720, the plurality of USB host controllers are gated to prevent each of the USB host controllers from performing a fetch. In one embodiment, logic 240 of FIG. 2 performs this gating function. Once a first USB host controller is active and fetching, any other USB host controller is gated to prevent it from performing a fetch until a start of frame marker is observed. Determining whether any of the USB host controllers is active and should be gated involves determining whether a "run" bit is set for those USB host controllers. In one embodiment, a pausing mechanism may be utilized to gate the USB host controllers until a start of frame marker is observed.

Finally, at processing block 730, logic 240 allows the plurality of host controllers to each perform a fetch simultaneously with the other USB host controllers. As described above, the plurality of host controllers are allowed to perform their fetch once a start of frame marker is observed. In this way, the plurality of USB host controllers will be synchronized, thus allowing a processor to enter a low power state.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. An apparatus, comprising:
a plurality of controllers including a controller whose fetches are not synchronized with fetches of one or more other controllers of the plurality of controllers; and
logic coupled to the plurality of controllers to synchronize the unsynchronized controller such that the unsynchronized controller performs fetches simultaneously with the one or more other controllers by preventing the unsynchronized controller from performing a fetch until a start of frame marker from the one or more other controllers is observed, wherein the start of frame marker is associated with a timer that indicates when a time period to synchronize the plurality of controllers has expired;
wherein if a run indication from one or more other unsynchronized controllers is set before the start of frame marker is observed, the logic utilizes a pausing mechanism to prevent the one or more other unsynchronized controllers from performing a fetch.

2. The apparatus of claim 1, wherein the logic is a state machine.

3. The apparatus of claim 1, wherein observing a start of frame marker includes receiving a timer expiration indication from the one or more other controllers.

4. The apparatus of claim 1, wherein the logic comprises one or more registers to indicate a state of each of the plurality of controllers.

5. The apparatus of claim 4, wherein the one or more registers each store an indication representing the state of each controller, the indication representing a first state if the controller is inactive and representing a second state if the controller is active.

6. The apparatus of claim 5, wherein if two or more registers are set to the second state a pausing mechanism prevents all but one of the controllers from performing a fetch until a start of frame marker is observed.

7. The apparatus of claim 1, where in the plurality of controllers comprise Universal Serial Bus (USB) host controllers.

8. A system, comprising:
a memory controller located on a processor die; and
a controller hub communicatively coupled to the memory controller including:
a plurality of controllers including a controller whose fetches are not synchronized with fetches of one or more other controllers of the plurality of controllers; and
logic coupled to the plurality of controllers to synchronize the unsynchronized controller such that the unsynchronized controller performs fetches simultaneously with the one or more other controllers by preventing the unsynchronized controller from performing a fetch until a start of frame marker from the one or more other controllers is observed, wherein the start of frame marker is associated with a timer that indicates when a time period to synchronize the plurality of controllers has expired;
wherein if a run indication from one or more other unsynchronized controllers is set before the start of frame marker is observed, the logic utilizes a pausing mechanism to prevent the one or more other unsynchronized controllers from performing a fetch.

9. The system of claim 8, wherein the logic is a state machine.

10. The system of claim 9, wherein if a first controller of the plurality of controllers is active, the logic operates to prevent the one or more other controllers from performing a fetch until a start of frame marker from the first controller is observed.

11. The system of claim 8, wherein observing a start of frame marker includes receiving a timer expiration indication of the timer from the first controller.

12. The system of claim 8, wherein the plurality of controllers comprise Universal Serial Bus (USB) host controllers.

13. A method, comprising:
initiating a plurality of host controllers including a controller whose fetches are not synchronized with fetches of one or more other controllers of the plurality of controllers; and
synchronizing the unsynchronized controller to perform fetches simultaneously with the one or more other controllers by preventing the unsynchronized controller from performing a fetch until a start of frame marker from the one or more other controllers is observed, wherein the start of frame marker is associated with a timer that indicates when a time period to synchronize the plurality of controllers has expired;
wherein if a run indication from one or more other unsynchronized controllers is set before the start of frame marker is observed, the logic utilizes a pausing mechanism to prevent the one or more other unsynchronized controllers from performing a fetch.

14. The method of claim 13, wherein the synchronizing is performed by logic comprising a state machine.

15. The method of claim 13, wherein the plurality of controllers comprise Universal Serial Bus (USB) host controllers.

* * * * *